Feb. 4, 1958 W. E. HEFFNER 2,822,020

VEHICLE WHEEL

Filed April 18, 1956

INVENTOR.
WILLIAM E. HEFFNER
BY
*McGrew and Edwards*
ATTORNEYS

United States Patent Office 2,822,020
Patented Feb. 4, 1958

2,822,020

VEHICLE WHEEL

William E. Heffner, Denver, Colo.

Application April 18, 1956, Serial No. 578,953

2 Claims. (Cl. 152—405)

This invention relates to improvements in automotive wheels for supporting pneumatic tires and more particularly to improvements in wheels arranged to support tubeless pneumatic tires so that such tires are easily mounted and dismounted from said wheel.

With the wide-scale commercial use of tubeless pneumatic tires new problems have arisen for the people who mount and dismount such tires from vehicle wheels. Since the tires are tubeless the rim of the wheel becomes part of the unit necessary to hold air. The bead of such tire must, therefore, make a hermetic seal with the bead groove of the wheel, and the rim of the wheel must be substantially airtight to prevent air from leaking from the tire. In using ordinary tire mounting and dismounting tools it has been discovered that small nicks in the bead of the tire will prevent satisfactory sealing between the bead and the bead groove so that the tire leaks. Also, any bending or denting of the rim flange which houses the bead groove will prevent a seal and the tire will leak. Furthermore, since the beads of the tires form the sealing portion of the tires on the rim and they are precision made, they are made to be a tight fit in the bead groove of the wheel. Since the beads are a tight fit in the bead groove, it is very difficult to get the normal tire irons and tools in between the bead and the rim for pulling the bead over the rim and thereby dismounting the tire from the wheel. Unless extraordinary care is taken in pushing the tire iron between the rim and the bead and in pulling the bead over the rim, the bead will be nicked and the sealing qualities of the bead in the groove will be destroyed. This is especially true with tubeless truck tires which are large and have thick side walls and treads, making them very stiff.

According to the present invention a wheel is provided having one removable side flange containing a flange providing a bead groove so that a tire may be slipped over the rim of the wheel with ease and without the use of tire irons or special tools for removing the tire from the wheel. Means are provided for positively sealing the removable flange to the wheel so as to form a hermetic seal for the wheel and a mounted tubeless tire. Means are also provided so that the removable flange may only be placed in one position on the wheel so as to prevent any unbalancing of the wheel by placing the flange in various positions. The wheel arrangement with its removable flange is arranged so that only a single wrench is required in mounting and dismounting a tire from the wheel, and such mounting and dismounting is performed without any bead stretching or tire tools being used on the tire bead or the bead groove thereby minimizing damage to the tire and the wheel.

Included among the objects and advantages of the present invention is an improved wheel for vehicles arranged to support a tubeless tire hermetically sealed thereon. The wheel is provided with a removable flange which provides free access for mounting and dismounting a tire on the wheel. The wheel with the removed flange is arranged so that a tire may be mounted thereon without any stretching or manipulation of the beads of the tire. The wheel also is arranged for the removal and replacement of a tire thereon with the use of a single wrench for removing the nuts or lugs of the removable flange of the wheel. Means are provided to positively seal the flange to the rim so as to have a hermetic seal therebetween.

These and other objects and advantages of the invention may be readily ascertained by referring to the following description and appended illustrations, in which.

Figure 1:
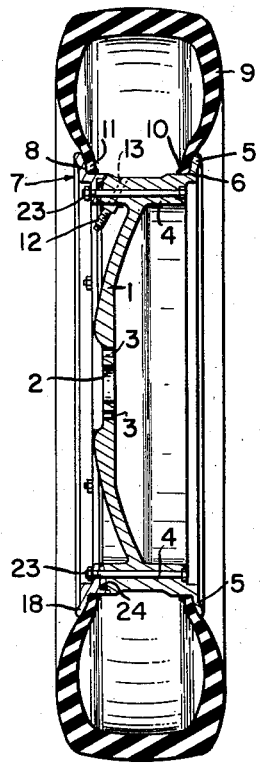
Fig. 1 is a cross sectional view of a wheel according to the invention, illustrating a tubeless tire mounted thereon.

In the device illustrated in Fig. 1, a circular wheel portion or central web 1 is provided with a central hub hole 2 having a plurality of holes 3 therethrough arranged for mounting on the studs of the brake drum of an automobile or other vehicle. In a standard vehicle wheel, five equi-spaced studs are provided on the drum so that the wheel may be mounted in various positions thereon, and lugs mounted on the studs releasably secure the wheel on the brake drum. A substantially axially aligned cylindrical rim 4 is integrally mounted on the circular web section 1, and it includes an integrally attached radially extending annular flange 5 at one side thereof which provides a bead groove 6. A removable flange, shown in general by numeral 7, provides a bead groove 8 on the rim opposite groove 6 thereof. A pneumatic tire 9 is arranged to have one bead 10 mounted in the bead groove 6 on one side thereof and a bead 11 mounted in the bead groove 8 on the opposite side. When the beads are properly seated in the grooves, they provide a hermetic seal therebetween. The rim 4 is generally a solid rim so as to provide a leak-proof support for the tire. A valve stem 12 is mounted in and is interconnected with a passage 13 extending through the rim 4, providing means for introducing air into the tire.

Figure 2:
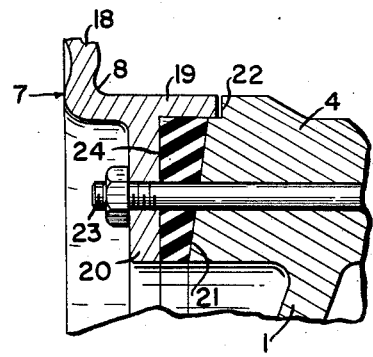
Fig. 2 is an enlarged detail of the sealing means for a removable flange according to the invention.

The removable flange 7, shown in detail in Fig. 2, includes an upstanding or radially extending annular flange member 18 which extends beyond an axially aligned cylindrical member 19. The member 19 is arranged to substantially align with the outer surface of the cylindrical rim 4. An inwardly extending annular flange member 20 is arranged to be mounted adjacent an annular, substantially radial surface 21 on the edge of the rim 4 for registering with the end of member 19. The removable flange 7 is mounted on the rim 4 by means of bolt and nut assemblies 23. Mounted between the surface 21 on rim 4 and the inwardly extending flange 20 is a gasket 24 which is arranged to provide hermetic seal between the removable flange 7 and the rim 4. The gasket 24 is an annular member having a plurality of holes arranged to register with the bolt and nut assemblies 23 and the holes of the flange. In cross section, the gasket 24 is substantially a truncated triangle having a thicker outer portion and a thinner inner portion. The triangular shape of the gasket provides positive sealing of the gasket and provides a hermetic seal for the rim and the removable flange. The member 19 extends at least partially over the gasket 24, forming a seat for the same, and providing some protection for the gasket.

In using the device of Fig. 1, the valve stem 12 is hermetically sealed in the air inlet 13 and the rim 7 is removed from the wheel. A tire is placed over the wheel via the side where the removable flange normally seats, and the gasket 24 is then placed on the bolts of the bolt and nut assemblies 23 against surface 21. The flange 7 is then placed over the bolts, and the nuts placed thereon are pulled tight. Air is introduced through the valve stem to inflate the tire 9. The triangular shaped gasket causes a tighter seal between the removable flange 7 and the rim 4 since the air pressure in the tire tends to force the gasket out from between the two members and since the distance between the two members progressively decreases from the outside to the inside of the wheel, the gasket is forced in tighter sealing engagement between the two surfaces.

Figure 3:
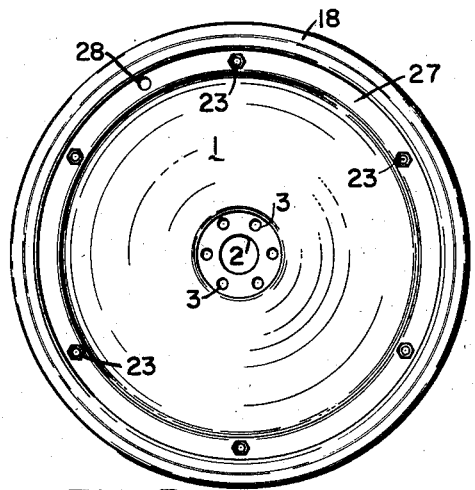
Fig. 3 is a top plan view of a modified wheel according to the invention.

In the modification shown in Fig. 3 a wheel 1 with its hub hole 2 and bolt holes 3 is provided with a removable flange section 27 which has a plurality of holes therein arranged to extend over the bolts of the bolt and nut assemblies 23 and thus be held on a rim of the wheel. The removable flange 27 is provided with an air inlet 28, into which a valve stem assembly may be hermetically sealed for providing air for the tire. The gasket between the flange 27 and the wheel 1 must, likewise, have a hole which registers with the air inlet 28 to provide a passage into the inside of the tire which may be mounted on the wheel. Since the hole 28 normally extends through the rim portion 4 of the wheel, the bolt and nut assemblies 23 may be equally spaced around the circumference of the rims so as to be substantially balanced. Since the hole in the rim and gasket must register with the hole in the flange, there is only one correct position for the flange. When a wheel has been balanced, lead weights are attached to the upstanding flange portion. When the tire is removed for fixing, the weights are not normally removed since the wheel should be maintained in balance. By having the hole through the rim 4, the valve stem hole provides a means for identifying the correct position of the flange so that the weights will be in correct position to have a balanced wheel on reassembly thereof.

With the device of Fig. 1, with its valve stem passing through the rim 4 and not through the removable flange, means must be provided for having a single position or for identifying the correct position of the flange in relation to the wheel so as to maintain the balance of the wheel. For this purpose the spacing of the bolt and nut assemblies 23 may be varied slightly so that there is only one position in which the flange will fit on the wheel. This is easily accomplished by merely moving one opposed set of the bolt and nut assemblies slightly one way or the other around the circumference of the flange. By moving the opposed nut and bolt assemblies the balance of the wheel is maintained intact but the flange will only fit in one position on the wheel. In this manner, the removable flange must be returned to its original position on the wheel, thereby maintaining the balance of the wheel.

The design of the present invention is relatively simple, and conventional wheels can be converted to the improved design with very minor changes. It is highly important, however, that the flange 7 provides a hermetic seal with the rim 4 so that there will be no leakage of air through the connection or the junction between the removable flange and its mating surface on the rim. Due to the air pressure in the tire directed outwardly against the removable flange, it is highly important to have a gasket arrangement which seals tighter under the influence of air pressure in the tire.

While the invention has been illustrated by reference to specific embodiments, there is no intent to limit the scope and spirit of the disclosure to the precise details so set forth, except insofar as defined in the following claims.

I claim:

1. An automotive wheel comprising in combination, a circular web having means for its attachment to a rotatable wheel support, a continuous annular rim integrally mounted on said web and extending substantially axially in both directions therefrom, a tire-bead engaging flange formed on one end of said rim and extending generally radially therefrom, a substantially radially extending first surface at the opposite end of said rim, a relatively flat removable flange removably mounted in axial register with said first surface, said removable flange including an inner surface arranged for juxtapositioning with said first surface and mounted at an acute angle thereto so that the radially inward edges of said surfaces are closer together than the outer edges thereof, a tire-bead engaging flange formed on said removable flange and extending radially therefrom in tire-bead engaging relation, an integral axial flange on said removable flange extending axially away from said bead engaging flange and arranged to slidably engage the outer surface of said rim, there being a plurality of bolt holes in said removable flange, a plurality of bolts mounted in the rim and extending through said first surface and arranged to register with and extend through the corresponding holes in said removable flange, and a gasket having a generally truncated triangular cross-section mounted between said rim and said removable flange with its base in outermost position, there being a plurality of holes in said gasket in registry with said bolts whereby said gasket may be maintained in position on said first surface during mounting and demounting operations and to form a hermetic seal between said rim and said removable flange.

2. An automotive wheel comprising in combination a circular web having means for its attachment to a rotatable wheel support, a continuous annular rim integrally mounted on the periphery of said web and extending axially in both directions therefrom, a bead engaging flange formed on one end of said rim and extending generally radially therefrom, a radially extending first surface at the opposite end of said rim, a relatively flat removable flange mounted in axial register with said surface, said removable flange including an inner surface arranged for juxtapositioning with said first surface and at an acute angle thereto so that radially inward edges of said surfaces are closer together than the outer edges thereof, a tire-bead engaging flange formed on said removable flange and extending radially in tire-bead engaging relation, an axial flange on said removable flange extending axially away from said bead engaging flange and arranged to slidably engage said rim, an annular groove on said rim peripherally of said surface in position to contact said axial flange on said removable flange, a plurality of bolts mounted in unsymmetrical relation on said rim and extending through said first surface, there being a plurality of bolt holes in said removable flange in position to register with said bolts through said first surface whereby said removable flange may be secured in only one position on said rim, and an annular gasket having a generally truncated triangular cross-section mounted between said rim and said removable flange with its base in outermost position, there being a plurality of holes in said gasket in registry with said bolts whereby said gasket may be mounted in one position on said first surface during the mounting and dismounting operations and form a hermetic seal between said rim and said removable flange.

References Cited in the file of this patent

FOREIGN PATENTS

| 77,197 | Netherlands | Feb. 15, 1955 |
| 1,098,290 | France | Mar. 2, 1955 |
| 725,767 | Great Britain | Mar. 9, 1955 |